United States Patent [19]

Steglich

[11] 4,011,440
[45] Mar. 8, 1977

[54] SYSTEM FOR GENERATING AN ANGULAR RATE SIGNAL FROM AN ANGULAR POSITION SIGNAL UTILIZING A CONSTANT AMPLITUDE-VARIABLE CARRIER PHASE SIGNAL

[75] Inventor: Helmar Rudolf Steglich, Marblehead, Mass.

[73] Assignee: General Electric Company, Wilmington, Mass.

[22] Filed: Apr. 29, 1975

[21] Appl. No.: 572,933

[52] U.S. Cl. .............................. 235/183; 235/186; 318/654; 340/347 SY
[51] Int. Cl.² ..................... G06G 7/18; G06G 7/22
[58] Field of Search ..... 235/183, 186, 189, 150.51, 235/150.52, 150.53; 318/571, 585, 616, 621, 622, 654, 648, 649, 661; 244/77; 324/160, 161; 340/347 SY

[56] References Cited

UNITED STATES PATENTS

| | | | |
|---|---|---|---|
| 3,584,783 | 6/1971 | Kobori | 235/189 |
| 3,629,705 | 12/1971 | Walters | 235/189 |
| 3,648,042 | 3/1972 | Perrett | 235/189 |
| 3,761,811 | 9/1973 | Aberle et al. | 318/654 |
| 3,872,388 | 3/1975 | James | 340/347 SY |
| 3,896,299 | 7/1975 | Rhodes | 235/186 |

*Primary Examiner*—Jerry Smith

[57] ABSTRACT

The instant invention relates to turn-rate signal generating circuitry for interrupting slaving of the directional gyro and roll erection of the vertical gyro in a heading, attitude and reference system whenever the turn-rate of the vehicle on which the system is mounted exceeds a predetermined rate. Cutoff of slaving and roll erection eliminates acceleration induced dynamic errors produced by excessive turn rates and is effectuated in response to a turn-rate signal (i.e., an angular rate signal) generated indirectly from angular position (i.e., shaft position) information. The angular position information is in the form of carrier signals amplitude modulated as a function of the sine and cosine of the angle $\theta$. These signals are converted to modify the carrier phases so that they are respectively sinusoidal and cosinusoidal functions of the carrier frequency. The sinusoidal and cosinusoidally varying carrier signals are combined to produce a constant amplitude, variable carrier-phase signal, the phase of which is directly proportional to the shaft angle $\theta$. The constant amplitude variable phase carrier is processed in a phase-to-pulse width converter to produce an output pulse which is proportional to the angle $\theta$. This signal is differentiated and filtered to produce a varying DC signal proportional to the angular rate of change ($d\theta/dt$). The rate signal is compared with a reference signal to determine when the rate of angular change exceeds a predetermined value to actuate turn-rate cutoff. By virtue of this novel arrangement, which does not require demodulation of the amplitude modulated carrier signal which represents angular position, the system is insensitive to variations in the excitation voltages for the electromechanical devices, such as synchros or the like, which produce the angular position signals.

8 Claims, 5 Drawing Figures

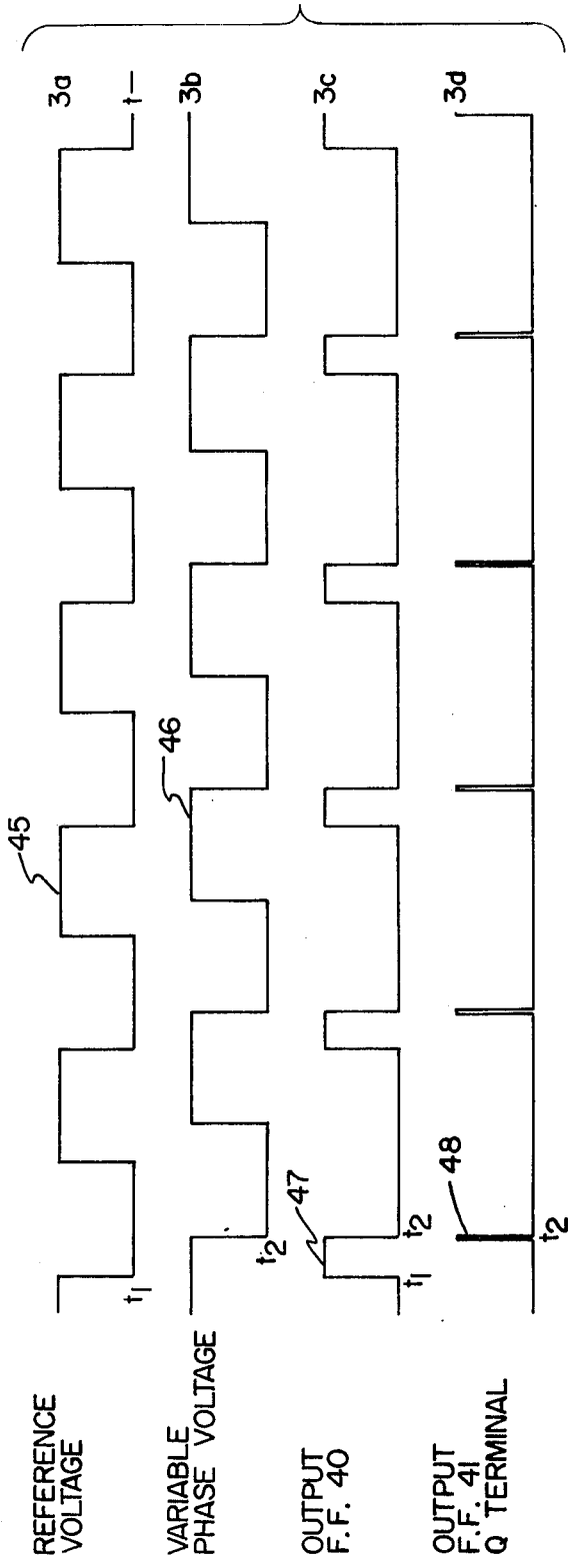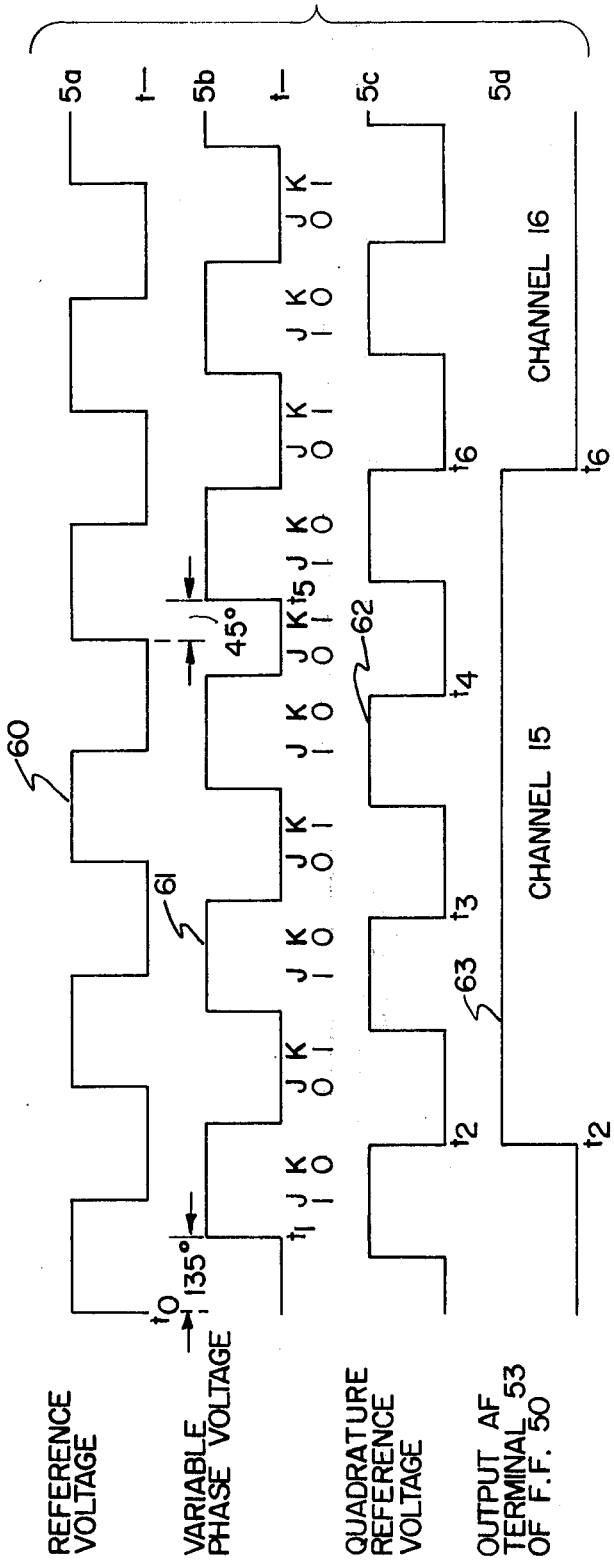

SYSTEM FOR GENERATING AN ANGULAR RATE SIGNAL FROM AN ANGULAR POSITION SIGNAL UTILIZING A CONSTANT AMPLITUDE-VARIABLE CARRIER PHASE SIGNAL

The instant invention relates to a system for electrically deriving an angular rate signal from an angular position signal. More specifically, it relates to circuitry for deriving an angular rate signal from angular shaft position information of an inertial heading, attitude and reference system to interrupt slaving of directional gyros to magnetic compasses and roll erection of the vertical gyros if rate of turn of the vehicle on which the system is mounted exceeds a predetermined rate.

In inertial heading, attitude and reference systems (HARS) utilizing directional gyros, vertical gyros and magnetic compasses, it is desired to interrupt slaving of the directional gyro to the magnetic compass and roll erection of the vertical gyro during high speed turns because the magnetic compass to which the directional gyro is slaved and the pendulous gravity sensor associated with the vertical gyro are subject to dynamic errors introduced by turn acceleration.

In the past, various approaches have been utilized to generate a signal which is proportional to this angular or "turn" rate so that slaving and roll erection of the gyros can be interrupted whenever the turn rate exceeds a value at which the dynamic errors introduced by the turn exceeds acceptable levels. Initially, electromechanical turn rate generators were utilized and were driven by the directional gyro, for example, to generate a signal proportional to the rate at which the gyro heading shaft was turning. A typical example of such an arrangement is an arrangement shown and described in U.S. Pat. No. 2,866,934 issued Sept. 30, 1958 in the name of Harold S. Whitehead, entitled "Directional System Sensitive to Rates of Turn" assigned to the General Electric Company, the assignee of the present invention. The system shown in the Whitehead patent which utilized an electromechanical rate generator was satisfactory for many applications. However, with the advent of very high performance aircraft, the utility of electromechanical rate generators for turn rate cutoff did not have the flexibility and scope desired for these applications. One of the alternative approaches which has been suggested is to generate the turn-rate cutoff signal by suitably processing an angular position signal. Thus, for example, an angular position signal $\theta$ obtained from a synchro mounted on the directional gyro shaft is processed electronically to derive a signal proportional to the rate of change of the shaft angle, i.e., $d\theta/dt$. One example of such an arrangement is illustrated in U.S. Pat. No. 3,514,719 issued May 26, 1970 in the name of M. H. Rhodes and entitled, "Electric Analog Angular Rate Deriving Circuit." A signal representative of the angle shaft position $\theta$ is converted by means of a Scott-Tee converter to two signals proportional to the sine and cosine, respectively of the angular angle. These sine and cosine signals which are in the form of amplitude modulated, single side band signals are synchronously demodulated to produce two DC voltages representative respectively of the sine and cosine of the shaft angle $\theta$. In the Rhodes system, these two signals are differentiated. These signals are then cross multiplied to produce two output signals which are respectively proportional to the cosine of the angle $\theta$ and the derivative of the sine of the angle $$\theta \frac{d(\sin\theta)}{dt}$$

in one channel and of the sine of the angle $\theta$ and the derivative of the cosine of the angle $d(\cos)/dt$. These two signals are then combined to produce an output signal which is proportional to the rate of change of the shaft angle, namely, $d\theta/dt$. This signal which is representative of the rate of change of angular position is then compared with a reference signal to generate a turn-rate cutoff signal whenever the angular rate of change, and therefore the rate at which the craft is turning, exceeded a predetermined value. While this system generates a turn-rate cutoff signal electronically, the circuit is highly sensitive to any variations in the magnitudes since it depends on synchronous demodulation of the output from the directional gyro synchro. Thus, in a system of the type shown in the Rhodes patent, it has been found that the output signal is also a function of the square of the synchro excitation voltage. As a result, any change in the excitation voltage results in substantial errors in the output rate signal since any variation in the excitation voltage would cause an apparent change in angular rate signal. Thus, in systems of this type, it is necessary to use either highly stable synchro excitation voltage source or closed loop servos or excitation voltage compensation techniques in order to avoid erroneous angular rate signals due to changes in excitation voltage. Obviously, the use of highly stable synchronous excitation voltage sources, servoloops or compensation techniques adds to the cost, complexity and weight of the system.

An alternative approach which is less sensitive to excitation voltage variations than a system of the type shown in the Rhodes patent is described in an Application for U.S. Letters Patent, Ser. No. 429,953, filed Jan. 2, 1974 in the name of Gerald L. Sullivan, entitled, "Turn Rate System for Gyroscopic Devices including Means for Generating Rate Signals by Electrically Processing Gyroscope Shaft Angle" assigned to General Electric Company, the assignee of the present invention. In the above identified Sullivan application, the turn-rate signal is derived by processing the shaft angle position signal from the direction by:
1. Converting the shaft signal into signal representative of the sine and cosine of the shaft angle,
2. Demodulating and differentiating the sine and cosine signals,
3. Squaring the differentials of the sine and cosine signals,
4. Summing the squared signals and,
5. Taking the square root of the sum of the squared differentiated signals to vector sum these two signals and thereby produce an output signal which is proportional to the rate of change of the shaft angle $\theta$, i.e., $d\theta/dt$.

The particular signal processing technique utilized in the above identified Sullivan application produced an angular rate signal $$V = E_m \frac{d\theta}{dt},$$

i.e., it varies linearly as a function of the sinusoidal synchro excitation voltage $E_m$. Thus, though the Sullivan system represented a substantial improvement over the approach described in the Rhodes patent in that it was much less susceptible to errors due to variations in excitation voltage, it is still subject to some errors if the excitation voltage varies.

Hence, a need exists for generating an angular turn-rate signal for a heading attitude and reference system in which the angular rate signal is generated from an angular (shaft) position signal in such a manner that it does not depend on synchronous demodulation of a modulated carrier signal and hence is independent of variations in the synchro excitation voltage.

It is therefore a primary objective of the instant invention to generate a turn-rate signal for a heading, attitude and reference system which is not sensitive to variations in excitation voltge of the electromechanical device which produces the angular position signal from which the rate signal is derived.

A further objective of this invention is to provide an arrangement for generating angular rate signals from an angular position signal which is not sensitive to variations in excitation voltage levels.

Other objectives and advantages of the invention will become apparent as the description thereof proceeds.

Briefly, in accordance with one aspect of the invention, turn-rate cutoff, i.e., interrupting slaving of the directional gyro and roll erection of a vertical gyro, is effectuated in response to a turn rate signal which is generated indirectly from shaft angle (i.e., heading) information to produce a signal proportional to the rate at which the directional gyroscope output shaft rotates during turns. This shaft angle information is processed by first converting the shaft angle signal into the sine and cosine components of the shaft angle. The sine and cosine components are modified and then combined in a manner to produce a constant amplitude, variable phase carrier signal with the phase of the carrier being directly proportional to the shaft angle. This constant amplitude, variable carrier phase signal is converted in suitable phase angle to pulse width conversions circuitry to produce a constant amplitude, variable pulse width square wave, the width of which is directly proportional to the shaft angle $\theta$. This signal is filtered and differentiated to produce a varying DC signal which is directly proportional to the angular rate. The varying DC signal is compared with a reference signal to produce a turn-rate cutoff signal whenever the angular rate signal exceeds a predetermined value, thereby indicating that the turn rate of the aircraft is such that cutoff or interruption of slaving and roll erection is desirable. Since the rate signal is derived by first converting the angular position signal to a constant amplitude variable phase signal, variations in the synchro excitation voltage have no effect on the rate signal and consequently, errors due to excitation voltage variations are eliminated. Therefore, there is no need for highly stable synchro excitation voltage sources or the use of closed loop servos or compensation techniques. The present arrangement therefore provides an accurate means for generating an angular rate signal from an angular position which is not susceptible to errors due to variations in excitation voltage.

The novel features which are believed to be characteristic of this invention are set forth with particularity in the appended claims. The invention itself, however, both as to its organization and mode of operation, together with further objectives and advantages, may best be understood by reference to the following description taken in connection with the accompanying drawings in which:

FIG. 3 is a wave form diagram useful in understanding the operation of the phase to pulse width converter circuit of FIG. 2.

FIG. 5 is a wave form diagram useful in understanding the operation of the switch of FIG. 4.

The system described consists essentially of an angular position signal generating apparatus shown generally at 1 which produces two amplitude modulated signals representing the sine and cosine of the position angle $\theta$. These angular position signals are coupled to a network shown generally at 2 in which the carrier of one of the signals is modified so that the carriers are converted to the sinusoidal and cosinusoidal form. The sinusoidally and cosinusoidally varying carriers are combined in a network 3 to produce a constant amplitude, variable carrier phase signal in the form of a variable phase square wave, the phase of the carrier being proportional to the angle $\theta$.

Figure 1:
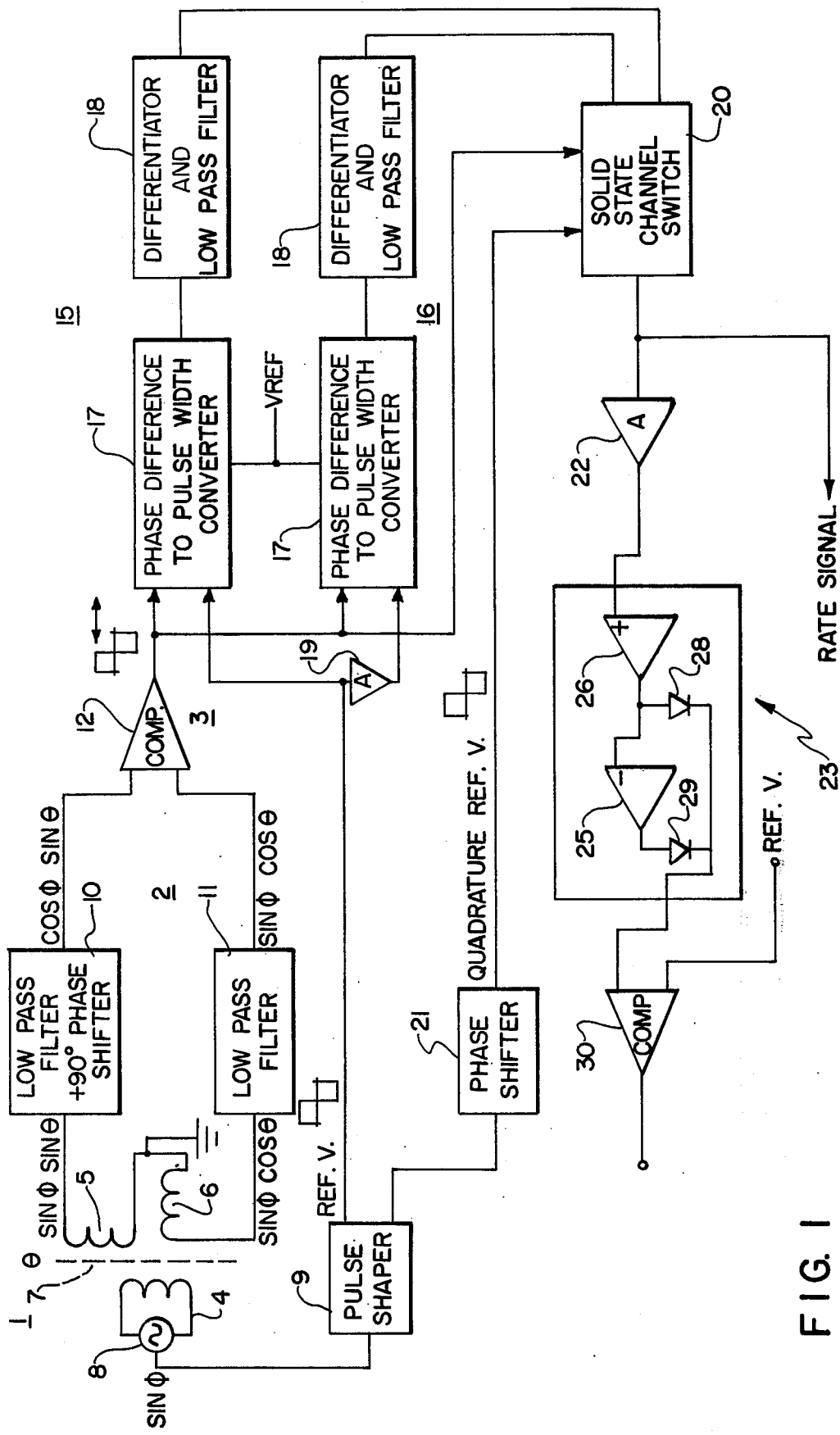
FIG. 1 is a block diagram of the cutoff signal generating circuitry showing the manner in which the angular position signal is processed to produce an angular rate signal proportional to the rate of turn.

The angular position signal generating apparatus may take any one of a number of well-known forms and in FIG. 1 is illustrated as having a rotor winding 4 mounted on shaft 7 and a pair of quadrature stator windings 5 and 6 with shaft 7 being driven to various angular positions by the directional gyro. A sinusoidal excitation voltage sin $\phi$, which may typically be a 400 Hz voltage, is impressed on rotor winding 4 from a suitable source 8. Stator windings 5 and 6 are so wound that their outputs are respectively proportional to the sine and cosine of the mechanical angle $\theta$ through which shaft 7 is driven. The ouput signals from these windings are therefore:

$$E_s = \sin \phi \sin \theta$$
where $\sin \phi = E_m \sin \omega t$
(the excitation voltage)
$$E_c = \sin \phi \cos \theta$$

and are respectively proportional to the sin and cos of the mechanical angle $\theta$. In FIG. 1 a resolver has been shown as the device for producing the signals proportinal to the sin and cos of the mechanical angle $\theta$. It will be understood, however, that this merely represents one particular mode of producing these signals. Other instrumentalities or combinations of instrumentalities can be used with equal facility. For example, an angular position signal from a three wire synchro associated with the gyro combined with a Scott-Tee transformer which converts the three wire input signal to two signals proportional to the sine and cosine of angle $\theta$ can be used with equal facility.

If a carrier frequency signal which is sine modulated is combined with an identical carrier which is cosine modulated the resultant signal is a constant amplitude-variable phase signal with the phase of the carrier varying as a function of the independent variable, in this case the angle $\theta$. Carrier modifying network 2 performs the function of converting the carrier signals to the sinusoidal and cosinusoidal form. To this end, a 90° phase shift is introduced between the two carriers to produce the sinusoidal and cosinusoidal variations of the carriers, Thus, the sin $\phi$ sin $\theta$ signal from winding 5 is impressed on a low pass filter and 90° phase shifting network 10 while the sine $\phi$ cos $\theta$ signal from winding 6 is impressed on low pass filter 11. A 90° delay or lag is impressed on the carrier of the sin $\phi$ sin $\theta$ signal, while the carrier of the sin $\phi$ is unaffected. The output from network 10 is therefore a cos $\phi$ sin $\theta$ while the output from network 11 is unchanged and remains sin $\phi$ cos $\theta$. The two signals now have the requisite sinusoidal-cosinusoidal relationship between the carriers to produce a constant amplitude/variable carrier phase and the two signals are applied to different terminals of a comparator 12 to produce varying phase square waves, the phase of which varies directly with the angle $\theta$. In this preferred embodiment the sinusoidally and cosinusoidally varying carrier are compared against each other in comparator 12 to produce the variable phase square wave. Alternatively, the two signals could be added directly to produce the constant amplitude/-variable carrier-phase signal. It can be seen that once the variable $\theta$ is converted to a varying phase angle then variations in the amplitude of the excitation voltage sin $\phi$ no longer affect the rate signal to be derived therefrom.

The variable phase square wave is impressed simultaneously on a pair of angular rate deriving conversion channels 15 and 16 in which the varying phase square wave is first converted to an unidirectional voltage proportional to the phase variation, and hence $\theta$, and then processed to derive an angular rate signal. Each of the channels includes a Phase Difference to Pulse Width Converter 17 in which the varying phase square wave is compared to a reference signal which is obtained through pulse shaping network 9 from excitation voltage source 8 and thus has the same phase as the sin $\phi$ excitation voltage. Converters 17 produce output pulses which vary in width with the carrier phase and are thus directly representative of the angular position $\theta$. The variable width pulses are applied to differentiator and low pass filter networks 18 which convert the square wave to a DC voltage that varies as a function of the angle $\theta$. The DC voltage is differentiated to produce at the output a signal which is proportional to the rate of change of the angle $\theta$ and hence may be utilized to generate a turn-rate cutoff signal.

Low pass filtering is required to avoid actuation of the turn-rate cutoff circuit in response to normal yaw oscillation (which do not introduce dynamic errors in the slaved HAR) but only in response to excessive turn rates, which do. Such normal yaw oscillations can introduce "apparent" angular rates which are many times as great (50 times as great is not unusual) as the rate required for normal turn rate cutoff. By providing the low pass filter, signals due to yaw or heading rate oscillations are attenuated while not interfering with signals representing the lower constant rates of turn.

Channels 15 and 16, as will be shown in detail later, are both required in order to avoid discontinuities in the output from the differentiators as the angle $\theta$ goes through zero (0°) degrees or 360°. That is, as $\theta$ goes through 360°, the outputs from converters go from maximum pulse width as 360° is approached to a minimum as it reaches 0°. This rapid change from maximum to minimum voltage looks like a very rapid angular rate change over a very narrow range of angular values and could produce erroneous cutoff signals. To avoid any malfunction due to this discontinuity effect as $\theta$ goes through 360°, out of phase redundant channels are provided. To this end, the outputs from the channels are controlled so that they are always 180° out of phase. The reference square waves with which the variable phase square wave from comparator 12 in converters 17 are applied to in-phase opposition to channels 15 and 16. Thus, the reference wave is applied directly as one input to the Phase Pulse Width Converter in channel 16 and is applied to an inverting amplifier 19 which shifts it 180° before being applied to the channel 15 converter. Thus, when the signal from one channel is going through 360° and a discontinuity occurs, the signal in the other channel is 180° out of phase so that there is no discontinuity. By selecting only the channel which is going through an angular excursion in a safe range, such as between 90° and 270°, and switching to the other channel if the angle falls outside of this range, any problems with discontinuities may be eliminated.

The outputs from the two channels are applied to a solid state switch 20 which alternately connects one or the other channel to its output to amplifier 22, absolute value network 23 and turn-rate cutoff comparator 30. Switch 20 is controlled by the variable phase square wave and a quadrature reference voltage which is 90° out of phase with the main reference voltage. Switch 20 disables a channel whenever the voltage represents an angle $\theta$ less than 90° or greater than 270° thereby insuring that as the angle $\theta$ approaches values at which there is a discontinuity from the output of the channel, the other channel, which is 180° out of phase, is switched in.

The output from channel 20 is coupled through a suitable amplifier and filter network 22 to an Absolute Value Network 23 which converts the angular rate signal to a signal of one polarity regardless of the polarity of the input signal from channels 15 and 16. That is, since the output from channels 15 and 16 are true derivatives of the angular position, there will be a polarity reversal of the signal as the angular rate reverses. However, for comparison purposes, only the absolute value of the rate is desired. Network 23 consists of two operational amplifiers 25 and 26. Diodes 28 and 29 are connected to the outputs of the amplifiers and are poled to produce a positive output. As may be seen, the rate signal from amplifier 22 is applied to the non-inverting terminal of amplifier 26 and through diode 28 to an output terminal. The output of amplifier 26 is also applied to the inverting terminal of amplifier 25 which is connected through the positively poled diode 29 to the output terminal. If the input to network 23 is positive, the output of amplifier 26 will also be positive and diode 28 will pass a positive signal to the output terminal. The output from amplifier 25, on the other hand, is a negative voltage since the positive output from amplifier 26 is applied to its inverting terminal and diode 29 blocks the voltage. If, on the other hand, the input signal polarity is negative, the output of amplifier 26 is negative and diode 28 blocks the signal. However, the negative voltage applied to the inverting terminal of amplifier 25 produces a positive voltage at the output of that amplifier which is passed by diode 29 thereby producing a positive output voltage at the output terminal. It can be seen therefore that network 23, which may take various forms, produces an output of a given polarity no matter what the polarity of the input signal is.

The positive output signal from network 23 which is a DC voltage proportional to the angular rate of turn is applied to a comparator amplifier 30 which has a reference voltage applied to its other terminal to produce an output signal whenever the angular rate voltage exceeds the reference voltage indicating that the angular rate, and hence the rate of turn of the vehicle, has exceeded a predetermined value. The output from the comparator may then be utilized to actuate a relay or other circuitry to interrupt slaving of the directional gyro to the magnetic compass and interrupt roll erection of the vertical gyro.

It can be seen therefore that by means of this particular circuitry shown in FIG. 1, a constant amplitude/variable phase signal is produced which varies in phase with the angle $\theta$ and is processed to produce the angular rate signal. Since the amplitude is constant, variations in the excitation voltage for the electromechanical device which produces the angular position signal has no effect on the angular rate signal derived by means of this circuitry.

Figure 2:
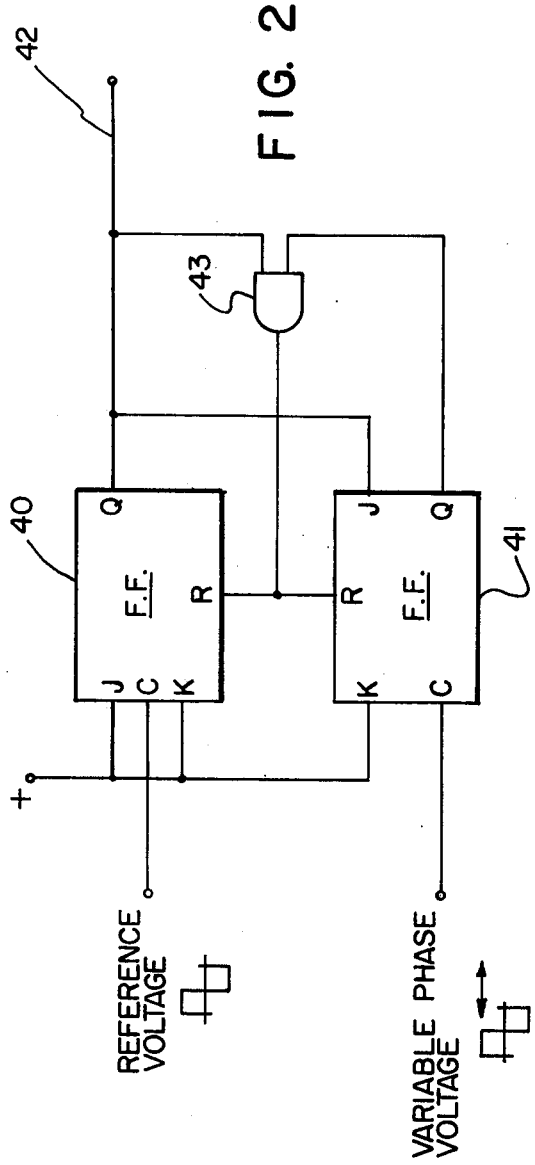
FIG. 2 is a block diagram of the phase difference to pulse width converter circuit forming a part of circuit of FIG. 1.

FIG. 2 illustrates a preferred embodiment of the Phase Difference to Pulse Width Converters 17 of channels 15 and 16 of FIG. 1. The phase difference to pulse width converter consists of a pair of interconnected J-K Flip-Flops 40 and 41 and a resetting AND gate 43 having its input coupled to the Q outputs of the two Flip-Flops to generate resetting pulses for these Flip-Flops. Flip-Flop 40 has a J and K input terminal connected to a source of positive or logic 1 signals and a clock terminal to which the reference square wave (having a frequency signal to the carrier frequency) is applied. The output or Q terminal of Flip-Flop 40 is connected to an output terminal shown generally at 42 which is applied to the low pass filter and differentiator. The output from the Q terminal of Flip-Flop 40 is also applied to the J input terminal of Flip-Flop 41 so that triggering of Flip-Flop 41 depends on the state of Flip-Flop 40. The variable phase square wave from comparator 12 of FIG. 1 is applied to the clock terminal of Flip Flop 41 and a positive or logic 1 voltage is permanently applied to its K terminal. The output from the Q terminal of Flip-Flop 41 is applied as one input to AND gate 43 as is the output from the Q terminal of Flip-Flop 40.

Because Flip-Flop 40 has been "toggled" and its Q output terminal goes to the high or logic 1 level, the J and K terminals of Flip-Flop 41 are both at the logic 1 level and this Flip-Flop is in condition to be "toggled." The output states of the terminals of a J-K Flip-Flop in response to each clock input pulse are defined by the following Truth Table for J-K devices which indicates the condition of the Q output terminal from the Flip-Flop after the receipt of a clock pulse as a function of the states of the J and K terminals of the Flip-Flop. It will also be understood that the Flip-Flops are triggered by the negative or trailing edges of a square wave clock pulse. The application of a high or logic 1 signal to the reset terminals of the Flip-Flops resets the Flip-Flops so that their Q terminals return to the logic 0 states.

| J | K | Q |
|---|---|---|
| 0 | 0 | Q |
| 1 | 0 | 1 |
| 0 | 1 | 0 |

-continued

| J | K | Q |
|---|---|---|
| 1 | 1 | $\overline{Q}$ |

As it can be seen from the above Truth Table, Flip-Flop 40 which has a logic 1 applied both to the J and K terminals is caused to "toggle" or reverse state whenever a clock pulse in the form of negative or trailing edge is applied to the clock terminal. Since the Flip-Flop is always reset to the logic 0 state at the end of each cycle, the appearance of a negative going clock pulse at the clock terminal toggles Flip-Flop 40 and drives the Q output to the high or logic 1 level. This also drives the J terminal of Flip-Flop 41 to the logic 1 state so that the appearance of the next clock pulse at the clock terminal of Flip-Flop 41, i.e., a negative going edge of the variable phase square wave, toggles Flip-Flop 41 causing the output of its Q terminal to go positive. Both inputs to AND gate 43 are now positive and the output of the AND gate, in a well-known manner, goes positive. The positive or logic 1 signal from AND gate 43 is applied to the reset terminals of Flip-Flops 40 and 41 resetting them to their logic 0 state and ready for the next cycle. Thus, the output at terminal 42 is a constant amplitude positive pulse, the duration of which varies as a function of the phase difference between the reference square wave voltage applied to Flip-Flop 40 and the variable phase square wave voltage applied to Flip-Flop 41.

The manner in which this variable width pulse is generated by means of the two Flip-Flops may best be understood in connection with wave form diagrams of FIG. 3. Thus, in FIG. 3a, the constant frequency reference wave is shown at 45 as a square wave which has a frequency equal to the frequency of the excitation carrier voltage applied to the angular position generating device of FIG. 1. FIG. 3b shows the variable phase square wave produced at the output of comparator 12 of FIG. 1 and is shown, for simplicity of illustration, to be a square wave which is lagging the reference wave by approximately 60°. At time $t1$, the negative or trailing edge of reference wave 45 which is applied to the clock terminal of Flip-Flop 40 causes that Flip-Flop to toggle. The output from the Q terminal of Flip-Flop 40, as shown in FIG. 3c, goes positive. Because Flip-Flop 40 has been "toggle" and its Q output terminal goes to the high or logic 1 level, the J and K terminals of Flip-Flop 41 are now both at the logic 1 level and this Flip-Flop is in condition to be "toggled." At time $t2$, which is determined by the particular phase difference shown, the variable phase square wave applied to the clock terminal of Flip-Flop 41 goes negative thereby toggling that Flip-Flop and causing its Q output terminal, as shown in FIG. 3d, to go positive. When the Q terminal of Flip-Flop 41 goes positive, both inputs to AND gate 43 are positive and its output goes positive applying a reset pulse to the reset terminal of Flip-Flop 40 and 41 resetting the Flip-Flops so that the outputs of their Q terminals go to the logic 0 state. As a result, the output of terminal 42 goes negative and the pulse appearing at the output of the converter has a width which is exactly equal to the phase difference between reference voltage 45 and the variable phase voltage 46. The converter is now ready for the next cycle and will produce a constant amplitude pulse of a width which is directly proportional to the phase difference between the two voltages which, in turn, is proportional to the angular position, i.e., $\theta$. Since the amplitude of the signal is constant and the width of the signal varies directly as a function of the phase difference which in turn, is directly proportional to the angular position, the average voltage is equal to the duration of the pulse and hence the angular position. It can be seen therefore, that the average DC voltage which is produced from this variable pulse width depends only on the pulse width and is not affected by any variations in the excitation voltage for the resolver or synchro which produces the angular position signal.

It will be apparent from looking at the wave forms of FIG. 3 that as pulse 47 increases in width, with increasing phase differences, a point is reached as the angle $\theta$ goes through 360° where there is a 100% pulse width. Consequently, at some point the negative going edge of the variable phase voltage 46 lines up exactly with the negative going edge of the reference voltage 45, i.e. with a 360° phase difference the two voltages are again in-phase. Consequently, with the negative-going clock pulse edges being exactly in time phase, the positive output from the converter appearing at terminal 42 goes virtually instantaneously from a very high value (i.e., from almost 100% pulse width) to zero as the 360° (or the zero degree point) is reached. This seemingly indicates an almost instantaneous 360° change which constitutes a very rapid rate of angular change and a very high apparent rate of turn, when this actually may not be the case. This, in effect, represents a discontinuity which can introduce errors into the system. Consequently, as was pointed out generally in connection with FIG. 1, a means is provided for avoiding this problem by providing two channels which are 180° out of phase. Thus, when one channel is approaching or going through the 360° point, where the discontinuity exists, the other channel, being 180° out of phase, is still producing a perfectly accurate reflection of the actual angular condition. Consequently, a problem of discontinuity is solved by providing a safety margin zone on either side of 360° and zero degrees so that the output from a given channel is used to generate a cutoff signal only if the angle lies within a predetermined band, for example, between 90° and 270°. If the angle is less than 90° or more than 270°, the switching arrangement is actuated to switch the output to the other channel which is offset 180° so that as the angle approaches the point of discontinuity, no discontinuity in the output is experienced.

Figure 4:
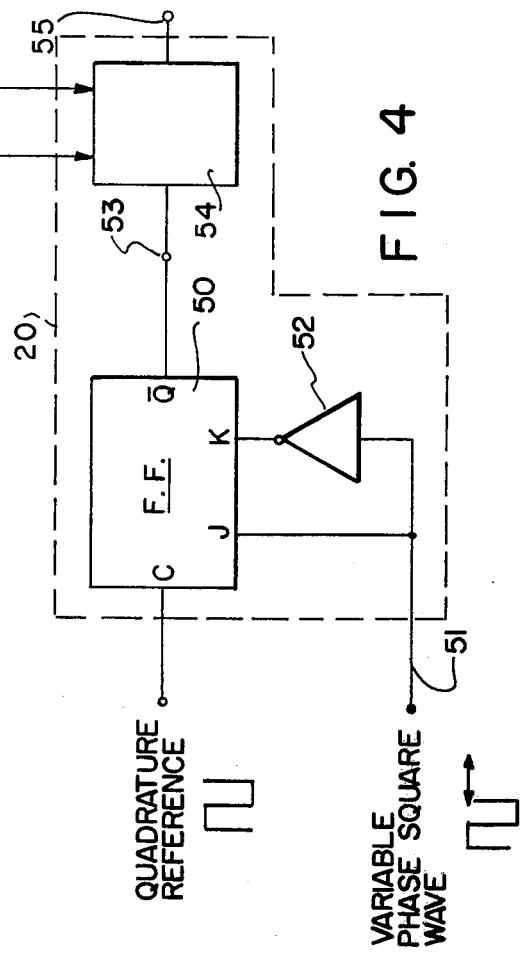
FIG. 4 is a block diagram of the solid state switch of FIG. 1 which provides switching between the channels of the circuit to avoid discontinuities in the output from the signal processing channel as the angle goes through 360°.

The switching network shown in FIG. 4 provides for switching between channel 15 and 16 at 180° intervals which are offset 90° from zero, or 360° so only that channel which senses an angular signal lying somewhere between 90° and 270° has its output applied to the comparator. The switching arrangement illustrated in FIG. 4 includes a J-K Flip-Flop 50 having a clock terminal to which a quadrature reference voltage (i.e., one 90° offset from the reference voltage applied to the converter in channels 15 and 16) is applied. The variable phase square wave signal 18 is applied 180° out of phase to the J and K terminals. To this end, the variable phase square wave is applied over leads 51 directly to the J-terminal of the Flip-Flop and through an inverting amplifier 52 to the K terminal. Thus, whenever the variable phase square wave is positive, the voltage at the J terminal will be at a high or logic 1 level and the voltage at the K terminal will be at the low or logic 0 level. Conversely, during the negative half of the square wave, the J terminal will be at low or logic 0 level and the K terminal will be at the high or logic 1 level. The output from the $\overline{Q}$ terminal 53 of Flip-Flop 50 is then applied to a solid state switch shown generally at 54. Switch 54 has two input leads from channels 15 and 16 so that switch 54 can selectively connect either channel 15 or channel 16 to the output amplifiers and comparator. Switch 54 may be any one of a number of commercially available switching devices which are capable of selectively connecting one of the two inputs to the output terminal 55 depending on the state of the $\overline{Q}$ output from Flip-Flop 50 which is applied to switch 54 over output terminal 53. For the logic states permitted at the J and K terminals, namely either 1 or 0, the operation of the Flip-Flop is in accordance with the following Truth Table:

| J | K | $\overline{Q}$ |
|---|---|---|
| 1 | 0 | 1 |
| 0 | 1 | 0 |

Thus, whenever the J and K terminals are respectively at the 1 and 0 level, the appearance of the next negative-going clock pulse drives the $\overline{Q}$ terminal to the logic 1 level and whenever the J and K terminals are at the logic 0 and logic 1 level respectively, the appearance of the next negative-going clock pulse drives the output to the logic 0 level.

The manner in which the switching control signal is generated to switch the outputs between the two channels may be best understood in connection with the wave form diagrams of FIG. 5 which illustrate the quadrature reference wave form, the variable phase input wave form the output from the Flip-Flop and also the basic reference wave form. Let it also be assumed that when the output from Flip-Flop 50 is high or at the logic 1 level, channel 15 is coupled to the comparator through the solid-state switch and when the output from the Flip-Flop 50 goes to the low or logic 0 level channel 16 is coupled to the output. The basic reference wave applied to the Phase Difference to Pulse Width Converters in channels 15 and 16 is shown as a wave form 60 in FIG. 5a. The variable phase square wave shown at 61 in FIG. 5b is applied via input terminal 51 to the J and K terminals of Flip-Flop 50 and is shown to be lagging the reference wave 60 by 135°, i.e., $\theta = 135°$. Wave form 62 in FIg. 5c illustrates the quadrature reference wave (i.e., at 90° to the reference wave 60) which is applied to the clock terminal of Flip-Flop 50. At time $t1$ the variable phase voltage applied to the J and K terminals goes positive so that the respective polarities at the J and K terminals are as shown in the legend underneath this positive alternation, namely the J terminals is at the logic 1 and the terminal is at the logic 0 level. With this condition, the appearance of a negative-going clock pulse at the clock terminal will drive the $\overline{Q}$ terminal of the Flip-Flop to the high or logic 1 level. Thus, assuming for example, a phase angle of 135° for the variable phase signal which can be seen by comparing wave form 60 and wave form 61, the system should be such that channel 15 is coupled through solid-state switch 26 to the comparator since the angular signal lies within the acceptable limits, namely between the 90° and 270°. It can be seen that at $t1$ when the variable phase square wave goes positive, the J and K terminals are conditioned to produce a positive output at terminal 53 of the Flip-Flop upon the next occurrence of a negative-going clock pulse edge from quadrature reference voltage 62. Thus, at time t2 when wave form 62 goes negative, Flip-Flop 50 switches and the output at the $\overline{Q}$ terminal switches from the logic 0 to the logic 1 state. As long as the phase difference of the variable phase signal with respect to the reference voltage is in excess of 90° and less than 270°, any subsequent negative-going transitions of the quadrature reference voltage do not switch Flip-Flop 50 since, as can be seen in FIG. 5c, each negative-going transition of voltage 62 occurs during an interval when the J and K terminals of the Flip-Flop are respectively at the logic 1 and logic 0 level meaning that the $\overline{Q}$ output terminals are already at the logic 1 level.

Assume however, that at some subsequent time, the angular position, as represented by the variable phase square wave, has shifted from 135° to 45°, i.e., below the critical 90° level so that the phase difference between the variable phase square wave 61 and the reference voltage 60 is only 45°. The next negative-going transition of the quadrature reference voltage at t6 now occurs during a negative interval of the variable phase square wave so that the J and K terminals of the Flip-Flop are at the logic 0 and logic 1 levels respectively. From the Truth Table referred to above, when the J and K terminals are respectively at the logic 0 and logic 1 levels, the appearance of the next clock pulse drives the $\overline{Q}$ terminal to the logic 0 level so that the output from terminal 53 of Flip-Flop 50, as shown in FIG. 5d, goes from the high or logic 1 level to the low and logic 0 level which, as explained previously, switches channel 15 off and couples channel 16 to the output so that there are no discontinuities in the event that the angular signal approaches or goes through zero. The output remains at this negative voltage since the succeeding negative-going transitions of the quadrature reference voltage occur during negative intervals of the varying phase square wave 61 when the J and K terminals are always at the logic 0 and logic 1 level which thus maintains the output of the Flip-Flop at the logic 0 level.

In a similar fashion, if the angular position signal were to exceed 270° in going in the direction of 360°, a similar switching of the output from one channel to the other would occur. It can be seen, therefore, that the discontinuity which is present as the signal approaches 360° or 0° is eliminated by utilizing the output from one channel whenever the angle lies between 90° and 270° and utilizing the output from the 180° displaced channel whenever the angle lies above 270° and below 90°.

In summary, a circuit for deriving an angular rate signal has been described which is not dependent in any way on the maintaining a close control of the excitation voltage level for the synchro or other electromechanical device which first derives or generates an angle signal from angular position from which the rate signal is subsequently derived. As a result, there are no errors introduced due to variations in the excitation voltage which eliminates the need for either closely regulated supplies or closed loop servo controls, or compensation techniques. This simplifies the circuitry for generating angular rate signals which may be utilized to generate turn-rate cutoff signals for heading and attitude reference systems.

While a number of specific embodiments of this invention have been shown and described above, it will, of course, be understood that the invention is not limited thereto since many modifications both in the circuit arrangement and in the instrumentalities employed therein may be made. It is contemplated by the appended claims to cover any such modifications which fall within the true spirit and scope of this invention.

What is new and desired to be secured by Letters Patent of the U.S. is:

1. In a circuit for deriving an angular rate of change signal from an angular position signal, the combination comprising;
   a. angular position signal generating means for providing two fixed phase carrier signals which are respectively amplitude modulated proportionately to the sine and cosine of the angle,
   b. means for converting the two fixed phase carrier signals which are amplitude modulated proportionately to the sine and cosine of the angle to a constant amplitude carrier signal, the phase of said constant amplitude carrier signal varying with respect to the phase of said two amplitude modulated fixed phase carrier signals with variations of angular position so that the phase of said constant amplitude carrier signal is proportional to said angular position,
   c. signal conversion means for converting the constant amplitude signal the phase of which varies with angular position to a unidirectional signal proportional to the angular rate of change including:
      1. first means to convert the constant amplitude signal the phase of which varies with angular position to a unidirectional signal which is proportional to the carrier phase and thus to the angular position,
      2. second means to convert said unidirectional voltage signal proportional to angular position to a unidirectional signal proportional to angular rate of change including means to differentiate the unidirectional signal proportional to angular position to derive a unidirectional signal proportional to angular rate of change.

2. The circuit for deriving an angular rate of change signal from an angular position signal according to claim 1 wherein said converting means for producing a constant amplitude carrier signal the phase of which varies with angular position, from two fixed phase carrier signals amplitude modulated respectively in accordance with the sine and cosine of the angular position includes:
   1. means for modifying the fixed phase amplitude modulated carrier signals to convert them to sinusoidally and cosinusoidally varying carrier signals, and
   2. means for combining the modified carrier signals to produce a constant amplitude, signal the phase of which varies with respect to the phase of the carrier of the two fixed phase signals with variations of angular position.

3. The circuit for deriving an angular rate of change signal from an angular position signal according to claim 2 wherein one of the amplitude modulated carrier signals is impressed on a phase shift network to shift its phase 90° relative to the other amplitude modulated signal whereby the carrier of the two signals are caused to vary sinusoidally and cosinusoidally respectively.

4. The circuit for deriving an angular rate of change signal from an angular position signal according to claim 3 wherein the means for combining the modified carrier signals includes summing means for adding the sinusoidally and cosinusoidally varying carrier signals.

5. The circuit for deriving an angular rate of change signal from an angular position signal according to claim 3 wherein the means for combining the modified carrier signals includes comparator means for comparing the sinusoidally varying amplitude modulated fixed phase carrier signal to the cosinusoidally varying amplitude modulated fixed phase carrier signal to produce a constant amplitude, variable phase square wave at the carrier frequency, the phase of which varies with respect to the phase of said amplitude modulated fixed phase carrier signals, the phase variation of said square wave being proportional to angular position.

6. The circuit for deriving an angular rate of change signal from an angular position signal according to claim 1 wherein the first means to convert the constant amplitude signal the phase of which varies with angular position to a unidirectional signal proportional to angular position includes;
   1. a phase to pulse width converter
   2. means to apply said constant amplitude signal to phase of which varies with varies with angular position and a reference carrier signal at the carrier frequency of said fixed phase carrier signals to said pulse width converter to produce a constant amplitude variable width pulse, the duration of which is proportional to the phase of the constant amplitude signal and therefore to the angular position.

7. The circuit for deriving an angular rate of change signal from an angular position signal according to claim 6 comprising;
   d. additional signal conversion means for converting the constant amplitude signal the phase of which varies with angular position to a unidirectional signal which is 180° out of phase with the unidirectional signal from the said signal conversion means including:
   1. an additional phase to pulse width converter,
   2. means to apply said constant amplitude signal the phase of which varies with angular position and a reference carrier signal at the carrier frequency of said fixed phase carrier signals to said additional signal conversion signal conversion means to produce a constant amplitude variable width pulse, the duration of which is proportional to the phase of the constant amplitude signal and thus to the angular position, the reference signal applied to the additional phase to pulse width converter in said additional signal conversion means for converting the constant amplitude signal being 180° out of phase with the reference signal applied to the phase to pulse width converter in said signal conversion means,
   2. means to switch between the outputs of said signal conversion means and said additional signal conversion means whenever the value of the angular position falls outside of a given range of values whereby discontinuities in the output as the angular position signal approaches 360° are avoided.

8. The circuit for deriving an angular rate of change signal from an angular position signal according to claim 1 including means to compare the unidirectional voltage proportional to angular rate of change to a reference voltage to produce a control voltage whenever the angular rate of change exceeds a predetermined value to interrupt slaving and roll erection of the directional and vertical gyros of a heading, attitude and reference system whenever the turn rate of the craft as represented by the angular rate of change exceeds a predetermined value.

* * * * *